United States Patent
Kobayashi (10) Patent No.: US 9,456,108 B2
(45) Date of Patent: Sep. 27, 2016

(54) IMAGE PROCESSING APPARATUS (71) Applicant: CANON KABUSHIKI KAISHA, Tokyo (JP)

(72) Inventor: Tomoki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/961,205

(22) Filed: Dec. 7, 2015

(65) Prior Publication Data

US 2016/0173723 A1  Jun. 16, 2016

(30) Foreign Application Priority Data

Dec. 16, 2014  (JP) ................. 2014-254032

(51) Int. Cl.
- *H04N 1/40* (2006.01)
- *H04N 1/405* (2006.01)
- *G06K 15/02* (2006.01)
- *H04N 1/60* (2006.01)
- *B41J 2/01* (2006.01)
- *G03G 15/00* (2006.01)
- *G06K 15/00* (2006.01)

(52) U.S. Cl.
CPC ............ *H04N 1/4052* (2013.01); *B41J 2/01* (2013.01); *G03G 15/50* (2013.01); *G06K 15/1876* (2013.01); *H04N 1/6027* (2013.01)

(58) Field of Classification Search
CPC ..... H04N 1/4052; H04N 1/6027; B41J 2/01; G03G 15/50; G06K 15/1876
See application file for complete search history.

(56) References Cited

U.S. PATENT DOCUMENTS

| 5,515,456 A | * | 5/1996 | Ballard ............... H04N 1/4052 358/3.03 |
| 2005/0195438 A1 | * | 9/2005 | Couwenhoven ..... H04N 1/4052 358/3.05 |
| 2012/0163713 A1 | | 6/2012 | Fukuda | |

FOREIGN PATENT DOCUMENTS

| EP | 0 859 507 | 8/1998 |
| JP | H06-233122 | 8/1994 |
| JP | 2001-136389 | 5/2001 |
| JP | 2001-218052 | 8/2001 |

OTHER PUBLICATIONS

European Search Report issued Apr. 25, 2016 during prosecution of related European application No. 15003590.5-1903.

* cited by examiner

*Primary Examiner* — Quang N Vo (74) *Attorney, Agent, or Firm* — Fitzpatrick, Cella, Harper & Scinto (57) ABSTRACT

An image processing apparatus includes a quantization unit configured to use a comparison threshold value; a generating unit configured to include an error input section for inputting error data between the quantized data generated and the pre-quantization data and a memory storing a value corresponding to a difference between the comparison threshold value and an original threshold value allocated in a threshold matrix and to generate the value corresponding to the difference as an addition data that is added to a value of an input image data of the processing object pixel, without using the error data input to the error input section for adjusting the input image data of the processing object pixel; and a processing unit configured to add the value of the addition data to the value of the input image data to output input image data to which the value of the addition data is added.

15 Claims, 11 Drawing Sheets

IMAGE DATA

FIG.3A

ERROR DIFFUSION PROCESSING

FIG.3B

DITHER PROCESSING

IMAGE PROCESSING APPARATUS

BACKGROUND OF THE INVENTION

1. Field of the Invention

The present invention relates to an image processing apparatus, and specifically, relates to a technique of executing quantization processing by an error diffusion method and a dither method using a common circuit.

2. Description of the Related Art

Image data having a large number of gradation levels expressed by multiple values is converted into image data having a smaller number of gradation levels by quantization and thereby print data is generated in a printing apparatus such as an inkjet printing apparatus. Conventionally, in this quantization, processing by a dither method (hereinafter called "dither processing") and processing by an error diffusion method (hereinafter called "error diffusion processing") are executed using a common circuit (Japanese Patent Laid-Open No. H06-233122 (1994)). Thereby, it becomes possible to perform quantization effectively utilizing the respective advantages of the dither method and the error diffusion method.

In Japanese Patent Laid-Open No. H06-233122 (1994), however, the dither method and the error diffusion method share only common functions; a comparator circuit comparing a pixel value expressed by image data with a threshold value and a circuit generating the threshold value. Specifically, except for the comparator circuit and the threshold value generation circuit, the dither processing and the error diffusion processing use respective individual circuits. Therefore, there is a problem such as one that it is not possible to effectively reduce a circuit scale by the configuration for sharing described in Japanese Patent Laid-Open No. H06-233122 (1994).

SUMMARY OF THE INVENTION

The present invention provides an image processing apparatus capable of effectively reducing the circuit scale in a configuration of executing the dither processing and the error diffusion processing using a common circuit.

The present invention in its one aspect provides an image processing apparatus comprising: a quantization unit configured to generate quantized data having smaller gradation levels than that of the pre-quantization data by using a comparison threshold value with which pre-quantization data of a processing object pixel is compared; a generating unit configured to include an error input section for inputting error data between the quantized data generated by the quantization unit and the pre-quantization data and a memory storing a value corresponding to a difference between the comparison threshold value and an original threshold value allocated in a threshold matrix that defines threshold values according to an arrangement of pixels and to generate the value corresponding to the difference as an addition data that is added to a value of an input image data of the processing object pixel, without using the error data input to the error input section for adjusting the input image data of the processing object pixel; and a processing unit configured to add the value of the addition data generated by the generating unit to the value of the input image data of the processing object pixel to output input image data to which the value of the addition data is added.

With the above configuration, it becomes possible to effectively reduce the circuit scale in a configuration of executing the dither processing and the error diffusion processing using a common circuit.

Further features of the present invention will become apparent from the following description of exemplary embodiments (with reference to the attached drawings).

DESCRIPTION OF THE EMBODIMENTS

In the following, there will be explained embodiments of the present invention in detail with reference to the attached drawings.

First Embodiment

Figure 1:
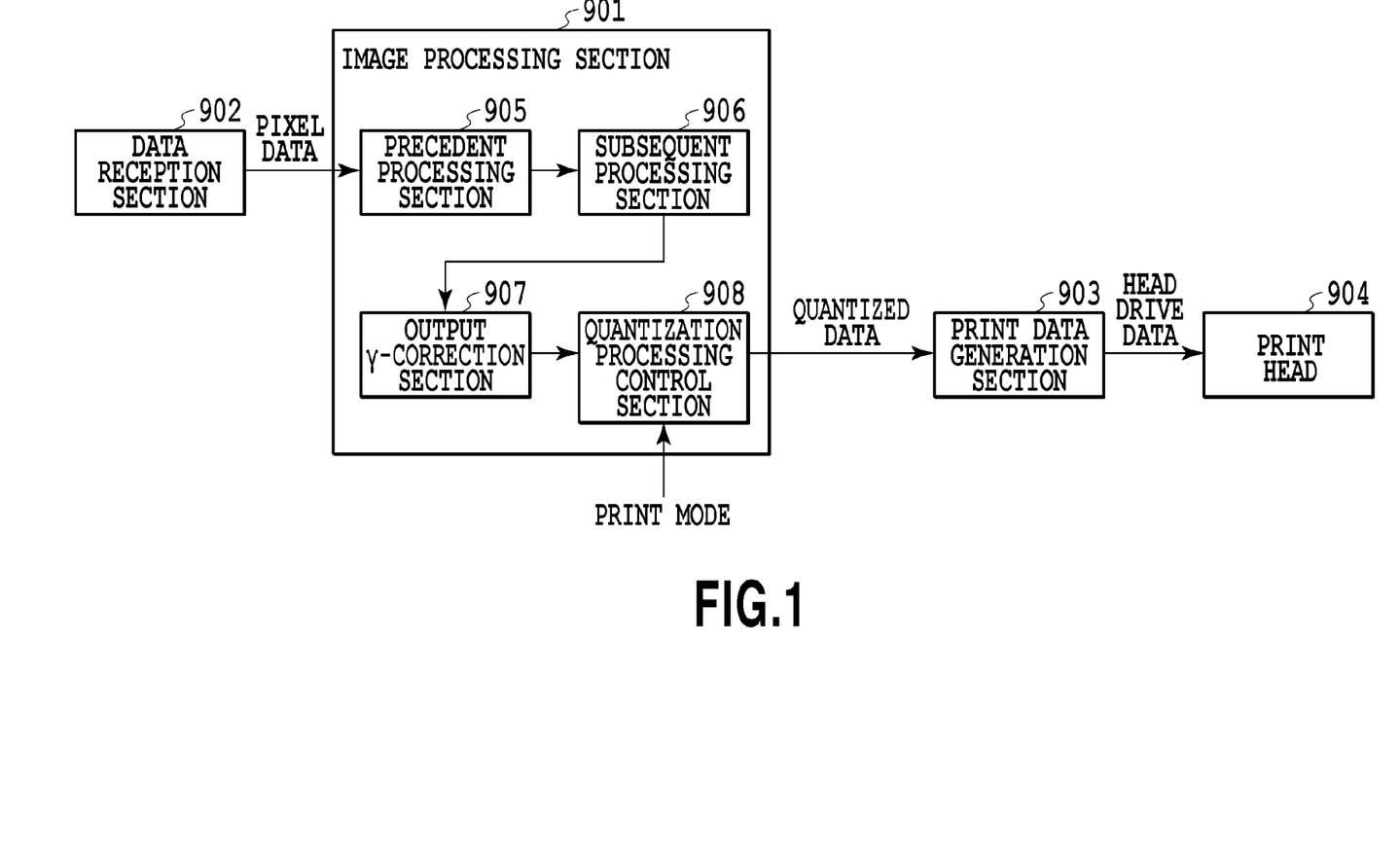
FIG. 1 is a block diagram showing a configuration for image processing in a printing apparatus according to an embodiment of the present invention.

FIG. 1 is a block diagram mainly showing a configuration for image processing in a printing apparatus according to an embodiment of the present invention, and the image processing configuration shown in the drawing is expressed as a processing function executed by a computer in the printing apparatus, except for circuits configuration to be explained in the following.

The printing apparatus of the present embodiment, as shown in FIG. 1, includes an image processing section 901, a data reception section 902, a print data generation section 903, and a print head 904. The data reception section 902 receives image data from a host apparatus such as a computer and a camera, and transmits the image data to the image processing section 901 as image data of a pixel unit.

The image processing section 901 includes a precedent processing section 905, a subsequent processing section 906, an output γ-correction section 907, and a quantization processing control section 908. The precedent processing section 905 performs conversion of a color indicated by the image data for each pixel on the input image data of 8 bits and 256 gradation levels. More specifically, the precedent processing section 905 performs gamut mapping of converting a color of a color gamut in the case that an image is reproduced in a host apparatus into a color of a color gamut in the case that the color is reproduced in the printing apparatus of the present embodiment. The subsequent processing section 906 converts the gamut-mapped input image data of the same 8 bits and 256 gradation levels into a combination of colors of inks ejected by the print head 904, the combination of colors being able to express a color indicated by the image data for each pixel. The output γ-correction section 907 performs γ-correction for each ink color according to a print head characteristic on the image data subjected to the subsequent processing. Then, the quantization processing control section 908, as will be described in detail in FIG. 2 and the following drawings, controls the quantization circuit of the present embodiment, quantizes the image data of 8 bits and 256 gradation levels, and outputs one bit binary data for each ink color. The quantization processing control section 908 of the present embodiment changes a quantization mode according to a print mode. More specifically, the quantization processing control section 908 executes quantization by the error diffusion processing and quantization by the dither processing using a common circuit, and executes the processing by switching the quantization by the error diffusion processing and the quantization by the dither processing depending on the print mode. For example, the quantization by the dither processing is performed in a mode in which print speed is given priority to image quality, and the quantization by the error diffusion processing is performed in a mode in which the image quality is given priority.

The print data generation section 903 generates print data (head drive data) for ejection in the print head 904 from the quantized binary image data, and transfers the print data to the print head 904.

Note that, while an inkjet printing apparatus has been explained as an example of the printing apparatus in the above explanation, the printing apparatus to which the quantization processing explained in the present embodiment can be applied is not limited to a printing apparatus of this type. For example, it will become apparent also from the following explanation that this quantization processing can be applied to a printing apparatus of an electro-photographic type, a heat transfer type, or the like.

Figure 2:
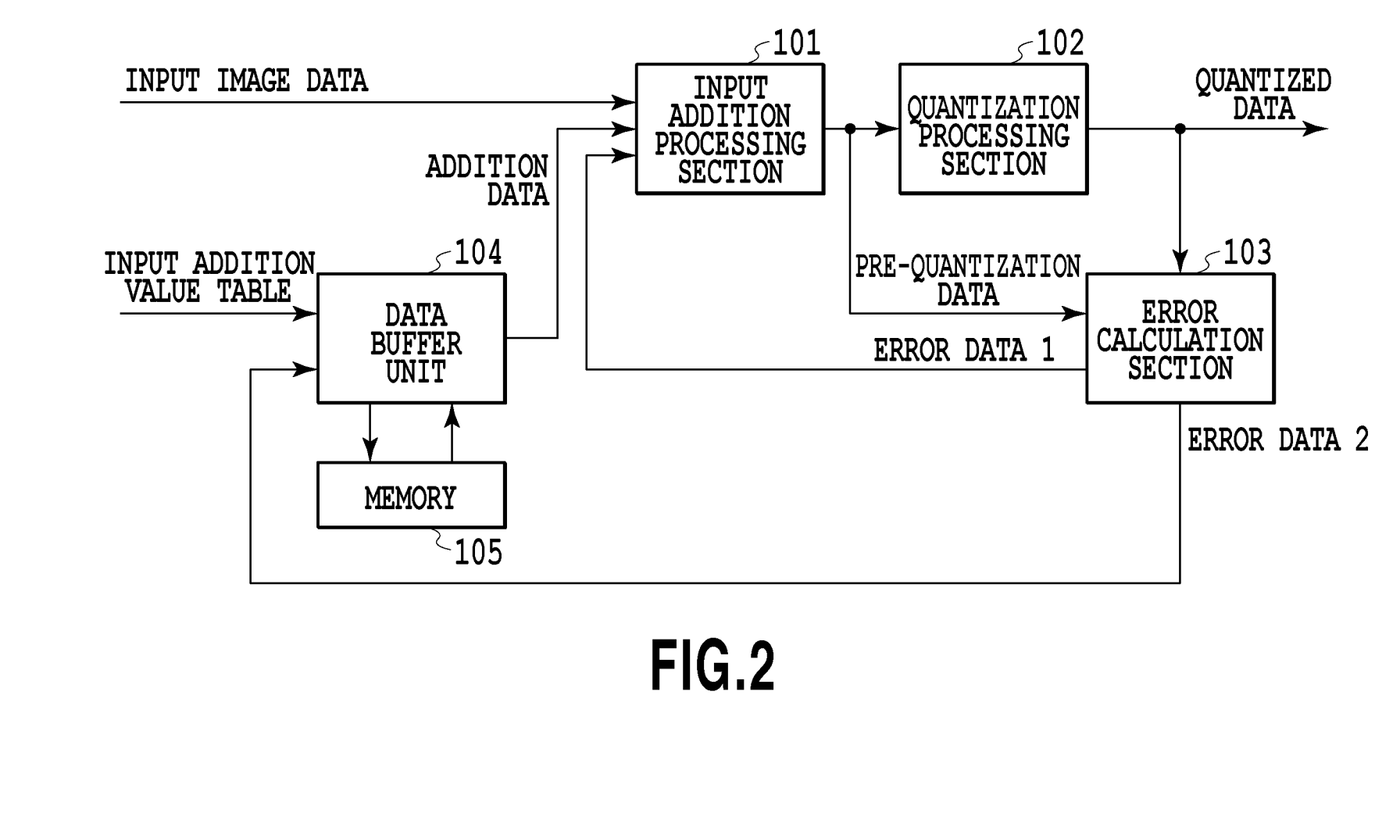
FIG. 2 is a block diagram showing a detailed configuration of a quantization processing control section shown in FIG. 1.

FIG. 2 is a block diagram showing a detailed configuration of the quantization processing control section 908 shown in FIG. 1. The quantization processing control section of the present embodiment includes an input addition processing section 101, a quantization processing section 102, an error calculation section 103, a data buffer unit 104, and a memory 105, and realizes the functions of these processing sections as circuit configurations. Then, the quantization processing control section of the present embodiment selects and executes the quantization by the error diffusion processing or the quantization by the dither processing.

Figure 3A:
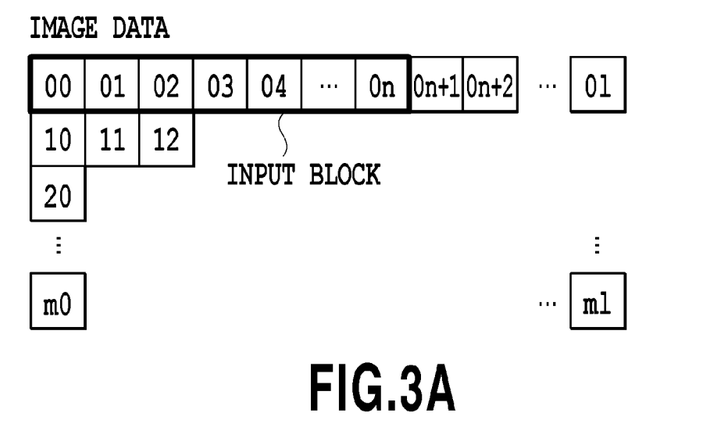
FIGS. 3A to 3C are diagrams explaining a processing section of image data in a quantization processing control section 908 shown in FIG. 2.
Figure 3B:
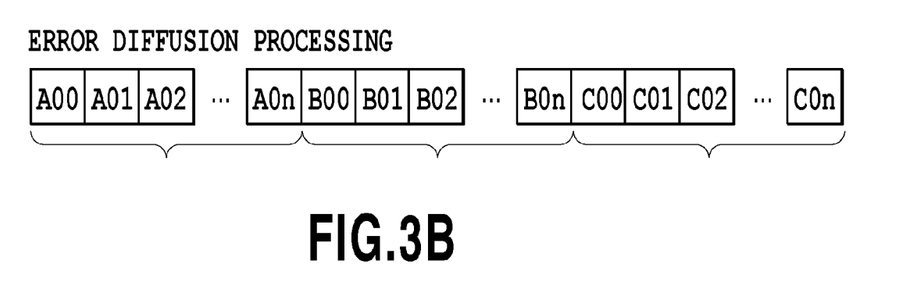
Figure 3C:
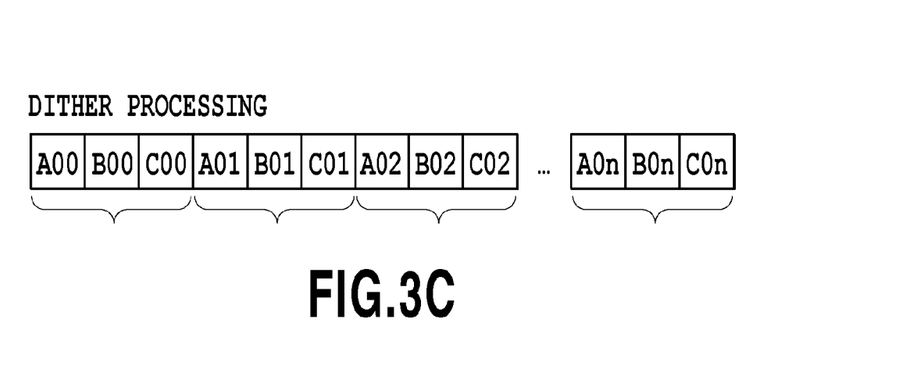

FIGS. 3A to 3C are diagrams explaining a processing unit of the image data in the quantization processing control section 908 shown in FIG. 2. The quantization processing control section 908 divides the input image data into input blocks each including a predetermined number of pixels, and performs the processing for each of the input blocks. FIG. 3A shows an example of the input block in the input image data, and shows that the input block is configured with n+1 pixels (00 to 0n), (0n+1 to 02(n+1)), ... in a width direction, in the case that the image data has an image width of l+1 and an image height of m+1. In the image data, after the processing is finished for all the pixels of an input block, the processing is performed on the next input block neighboring in the width direction. Then, after the processing is finished for one pixel line in the width direction, the processing is performed similarly for each of the input blocks on one pixel line under the pixel line.

The processing for each of the pixels in the input block is performed in a different order between the case of the error diffusion processing and the case of the dither processing.

In the case of executing the error diffusion processing, as shown in FIG. 3B, the processing is performed for each color in the input block. Specifically, the processing order of the pixels in the input block is that the error diffusion processing is performed on a pixel 00 in the image data of color A and then the processing is performed on the neighboring pixel 01 of the same color A. Then, after the error diffusion processing is finished for all pixels 00 to 0n in the block for color A, the processing is performed in the same manner on pixels 00 to 0n at the same pixel positions for next color B, and the processing is performed in the same manner also on next color C.

In the case of executing the dither processing, as shown in FIG. 3C, the processing is performed for each of the pixels in the input block. Specifically, after the dither processing is performed on the pixel value of color A in pixel 00, the processing is performed sequentially on color B in the same pixel 00 and on the color C in the same pixel 00. Then, after the processing is finished for all colors A to C on pixel 00, the dither processing is performed on next pixel 01.

With reference to FIG. 2 again, the pixel data of 8 bits and 256 gradation levels is input as the input image data into the input addition processing section 101 in the quantization processing control section 908, in a unit of one color for one pixel. The input addition processing section 101 adds addition data stored in the data buffer unit 104 and error data 1 of error data calculated by the error calculation section 103, to this input image data. The data after the addition of these pieces of data is input into the quantization processing section 102 as pre-quantization data. The input addition processing section 101 of the present embodiment has a maximum value and a minimum value of the pre-quantization data, and clips the above data after the addition to the maximum value in the case that the data after the addition has a value not smaller than the maximum value of the pre-quantization data, and to the minimum value in the case that the data after the addition has a value not larger than the minimum value of the pre-quantization value. The addition data input from the data buffer unit 104, as will be described later in detail, has a different content between the case of the error diffusion processing and the case of the dither processing.

The quantization processing section 102 quantizes the pre-quantization data input from the input addition processing section 101, and outputs the result as quantized data which is the binary data in the present embodiment. The quantization processing section 102 has one threshold value data to obtain the binary data, uses this threshold value in common between the case of performing the error diffusion processing and the case of performing the dither processing. That is, originally one threshold value is used in the quantization by the error diffusion processing, and this threshold value is used in common. On the other hand, in the case that the quantization by the dither processing is performed, the input addition value table to be described later is included in the addition data from the data buffer unit 104. Thereby, a value of the input addition value table is added to this common threshold value for each of the pixels, and a pattern having a predetermined size and different threshold values, that is, a dither pattern (matrix) is configured.

Note that, while the present embodiment is an example of obtaining the binary quantized data, as will be described later also in a second embodiment, it is possible to use a mode of obtaining quantized data having three or more levels and the quantization processing section 102 can have threshold values in a number corresponding to the number of these quantization levels. Then, it is possible to perform the quantization processing by using the respective threshold values in the error diffusion processing and the dither processing as described above. Further, as another mode of the quantization processing in the quantization processing section 102, it is possible to perform the quantization processing by multiplying the pre-quantization data by a quantization coefficient and carrying bit shift of the data after the multiplication. In this case, the quantization processing section 102 retains the quantization coefficients in a number corresponding to the number of quantization levels for the quantization, and the quantization coefficients are selected in a number corresponding to the number of quantization levels.

Figure 4:
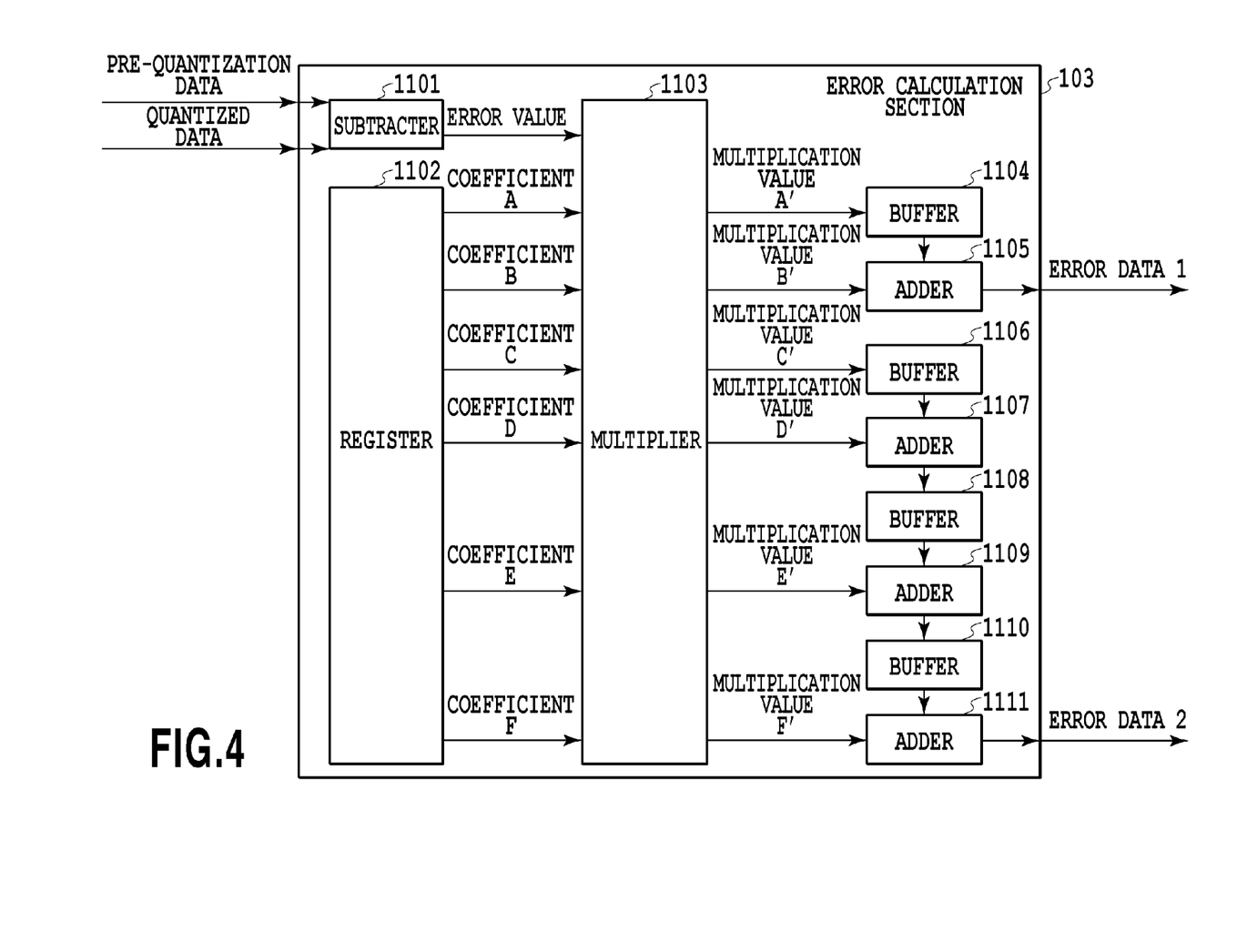
FIG. 4 is a block diagram showing a detailed circuit configuration of an error calculation section shown in FIG. 2.
Figure 5:
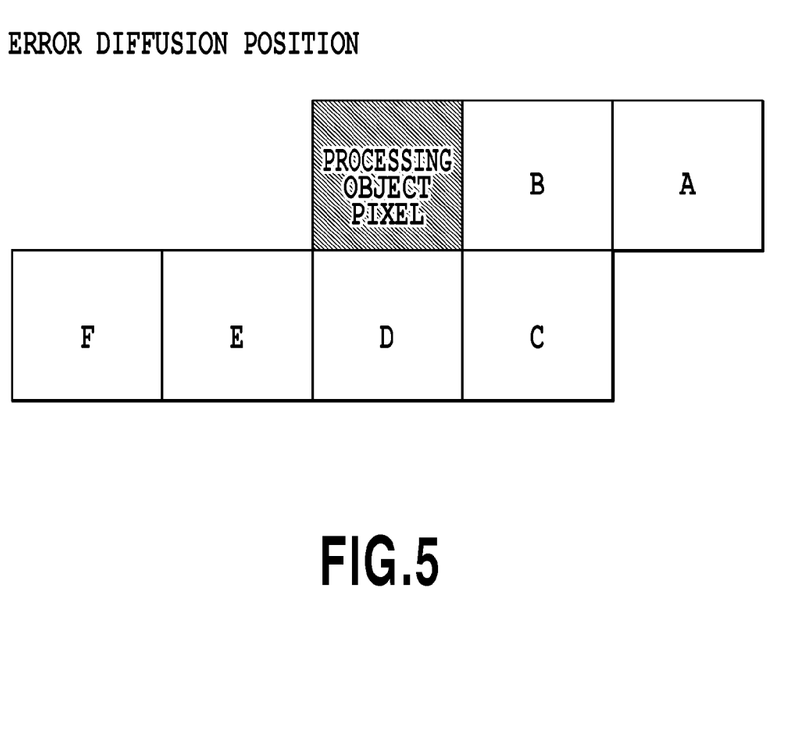
FIG. 5 is a diagram showing a pixel position to which error is diffused in error diffusion processing.

The error calculation section 103 generates error data 1 (also called "first error data") and error data 2 (also called "second error data") by performing processing to be described in detail in FIG. 4. In the case of the error diffusion processing, the error calculation section 103 compares the quantized data and the pre-quantization data to calculate an error caused by the quantization. In detail, the error calculation section 103 has a quantized data representative value according to the number of quantization levels (binary values (two levels) in the present embodiment) and the quantized data, and calculates the error by subtracting the quantized data representative value from the pre-quantization data. Further, the error calculation section 103 retains the error of a processing object pixel and the error of a pixel processed in the past for the errors obtained by the subtraction as above, and coefficients to generate the error data 1 and the error data 2 based on these errors. Then, in the case of the error diffusion processing, as shown in FIG. 5, the error calculation section 103 outputs an error to be diffused to pixels in the same line as the line of the processing object pixel in the image data according to the above coefficient as the error data 1, and outputs an error to be diffused to pixels in the line next to the line of the processing object pixel according to the above coefficient as the error data 2. The error data 1 and error data 2 thus output are input into the input addition processing section 101 and the data buffer unit 104, respectively, and retained until the next line processing.

On the other hand, in the case of the dither processing, only coefficient B in FIG. 4 is set to have a value except zero, and, as will be described later, the error data 1 is output including the error of the previous pixel multiplied by coefficient B and the error data in this case is used for inter-color correction.

FIG. 4 is a block diagram showing a detailed circuit configuration of the error calculation section 103. In FIG. 4, coefficients A to F are set in a register 1102 depending on the error diffusion processing or the dither processing which is set corresponding to the print mode as described above in FIG. 1. A subtractor 1101 subtracts the pre-quantization data from the quantized data representative value corresponding to the input quantized data, and calculates the error of the processing object pixel. Specifically, in the case of the quantization into binary data as in the present embodiment, the quantized data representative value is "0" in the case that the quantized data is "0", and the quantized data representative value is "255" in the case that the quantized data is "1". The error value calculated in the subtractor 1101 is provided for calculation using coefficients A to F in a multiplier 1103, and error data 1 and error data 2 are output finally. Further, each of buffers 1104, 1106, 1108, and 1110 provides output with a delay corresponding to a processing time of one pixel.

In the case of executing the error diffusion processing, each of coefficients A to F is a ratio of diffusing (scattering) the error caused in the processing object pixel to another pixel. FIG. 5 is a diagram showing a pixel position to which the error is diffused and the coefficient of the diffusion. As shown in FIG. 5, in the same pixel line, the error is diffused to a pixel neighboring the processing object pixel on the right side at a ratio indicated by coefficient B, and the error is further diffused to a pixel neighboring the pixel to which the error is diffused, at a ratio indicated by coefficient A. Further, in the line which is one line lower than the line including the processing object pixel, the error is diffused to pixels at the lower right side, the directly lower side, and the lower left side of the processing object pixel at ratios indicated by coefficients C, D, and E, respectively, and the error is further diffused to a pixel neighboring the lower left side pixel on the left side at a ratio indicated by coefficient F.

The multiplier 1103 generates values A' and B' by multiplying the error values obtained in the subtractor 1101 by coefficients A and B, respectively. The multiplication value A' gone through the buffer 1104 is added to the multiplication value B' by an adder 1105. As a result, a value obtained by adding the multiplication value by multiplying the error value of the processing object pixel by coefficient B and the multiplication value by multiplying the error value of the previously processed pixel by coefficient A is output as error data 1. This error data 1 is added to the input image data in the input addition processing section 101 as described above, and thereby the error is diffused to the next processing object pixel in the same pixel line as the line of the processing object pixel. Similarly, the multiplier 1103 generates values C', D', E' and F' by multiplying the error values obtained in the subtractor 1101 by coefficients C, D, E, and F, respectively. The multiplication value C' is gone through the buffer 1106 which stores the data of one pixel sequentially in the same manner and is added to the multiplication value D' in an adder 1107. Then, this addition result via the buffer 1108 is added to the multiplication value E' by an adder 1109. Moreover, this addition result via the buffer 1110 is added to the multiplication value F' by an adder 1111. As a result, a value obtained by adding the multiplication value by coefficient D for the error value of the processing object pixel, the multiplication value by coefficient C for the error value of the previously processed pixel, the multiplication value by coefficient E for the error value of the pixel processed two times before, and the multiplication value by coefficient F for the error value of the pixel processed three times before is output as error data 2. This error data 2 becomes the error data diffused to a one line lower pixel via the data buffer unit 104 as will be described below.

On the other hand, in the case of executing the dither processing, a coefficient to calculate a correction amount for the inter-color correction to be described later is set as coefficient B corresponding to the error of the processing object pixel. Thereby, error data 1 can be output to be added to the value of a neighboring processing object pixel (another color pixel in the case of dither processing as shown in FIG. 3C) for the inter-color correction. Note that, in the present embodiment, "1" is set as coefficient B to calculate the inter-color correction amount (inter-color correction data). Further, while coefficient A is set to zero, it is also possible to perform the inter-color correction on the color data of two pixels ahead by setting a coefficient to calculate the inter-color correction amount to coefficient A. Further, in the dither processing of the case without performing the inter-color correction processing, both of coefficient A and coefficient B are set to be zero. Moreover, in the dither processing, as will be described later, while coefficients C to F are set to be zero since error data 2 is not used, instead of this embodiment, the values of coefficients C to F can be set to any values.

Figure 6:
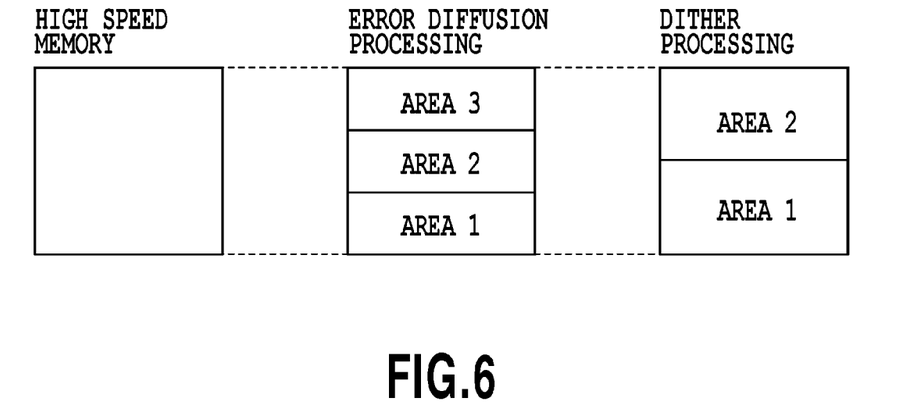
FIG. 6 is a diagram showing divided areas of a high speed memory within a data buffer unit shown in FIG. 2.

With reference to FIG. 2 again, the data buffer unit 104 switches between error data 2 and the input addition value table for use in the error diffusion processing and the dither processing. More specifically, the data buffer unit 104 outputs the addition data using error data 2 input from the error calculation section 103 in the case of executing the error diffusion processing, and outputs the addition data using the input addition value table in the case of executing the dither processing. The data buffer unit 104 monitors the pixel position of the input image data in this output of the addition data, and inputs data corresponding to the pixel position of the input image data among the data retained in the memory to the input addition processing section 101 as the addition data. The data buffer unit 104 of the present embodiment retains the data using a temporary memory included therein and the memory 105 outside the data buffer unit 104. The memory within the data buffer unit 104 is a high speed memory having a small capacity but having a comparatively high access speed and will be described later in FIGS. 7A and 7B, while the memory 105 is a memory having a large capacity but having a comparatively low access speed. Retaining information which is necessary for the processing object pixel in the high speed memory makes it possible to realize high speed processing. The high speed memory within the data buffer unit 104 is used by division into a plurality of areas according to the processing. FIG. 6 is a diagram showing divided areas of the high speed memory within the data buffer unit 104. As shown in FIG. 6, the high speed memory is used by division into three areas in the case of the error diffusion processing and used by division into two areas in the case of the dither processing.

Figure 7A:
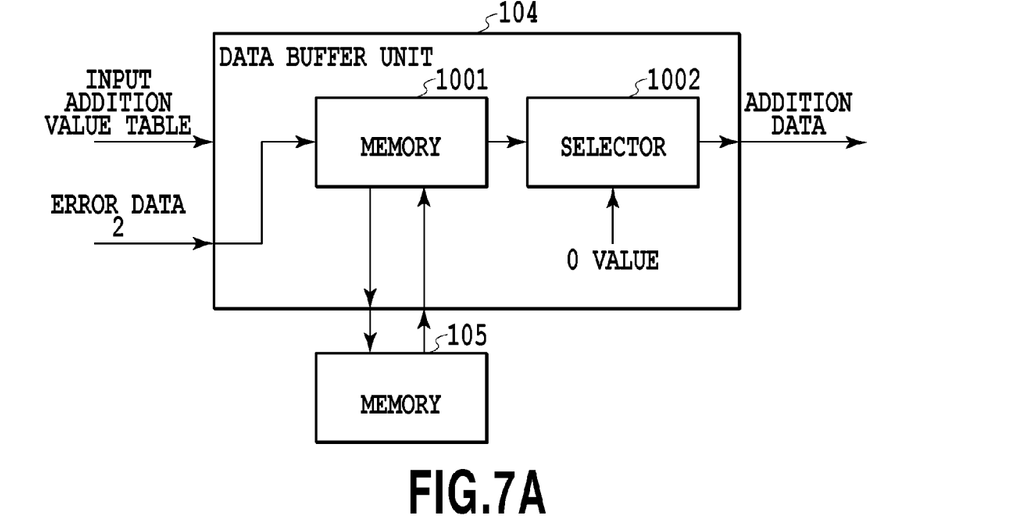
FIGS. 7A and 7B are block diagrams showing a detailed circuit configuration of a data buffer unit 104.
Figure 7B:
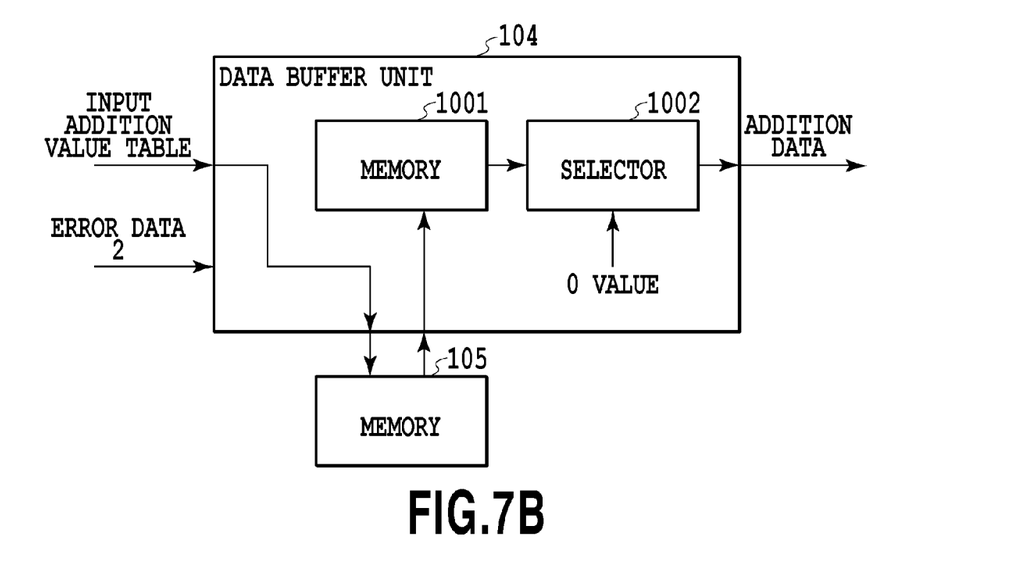

FIGS. 7A and 7B are block diagrams showing a detailed circuit configuration of the data buffer unit 104, and show a data flow in the case of executing the error diffusion processing and a data flow in the case of executing the dither processing, respectively. In FIGS. 7A and 7B, the memory 1001 is the above high speed memory within the data buffer unit. Further, a selector 1002 selects whether the data stored in the memory 1001 is output or value 0 is output as the addition data output from the data buffer unit 104.

In the case of executing the error diffusion processing, as shown in FIG. 7A, error data 2 is stored in the memory 1001 for each of the processing object pixels. Specifically, error data 2 is stored in an area (e.g., area 1) used as the input block being processed which includes the processing object pixel, among three areas shown in FIG. 6. The storing of error data 2 of this input block being processed is performed on an area after data output (output completed area) among the areas to be used. At the same time as this storing, error data 2 stored in an area (e.g., area 3) in the memory 1001 used for an input block before the input block including the processing object pixel, that is, error data 2 generated in the previous input block is transferred to the memory 105, and also error data 2 to be used for the next input block is transferred from the memory 105 to an area (e.g., area 2) in the memory 1001 to be used for the input block next to the input block including the processing object pixel. Specifically, the memory 105 stores error data 2 generated on the previous input block during the processing of some input block and thereby sequentially accumulates error data 2 for each of the pixels of one line. Then, for each of the input blocks, in processing of the input block before the processing timing for some input block, the memory 105 outputs error data 2 related to the processing one line before, corresponding to each of the pixels, and stores error data 2 into an area to be used for the input block.

The transfer between the memory 105 and the memory 1001 is performed in a unit of the input block. The data stored in an area to be used for the input block being processed is output for each of the pixels from the memory 1001 to the selector 1002. Then, in the processing of the next block, an area to be used for the next input block (e.g., area 2) is converted to an area used for the input block being processed, an area used for the previous input block (e.g., area 3) is converted to an area to be used for the next input block, and an area (e.g., area 1) used for the input block being processed is converted to an area used for the previous input block, respectively. Note that, while the data transferred from the memory 1001 to the selector is output as the addition data, in the case that the input image data is the first line of a page, the error data from the previous line does not exist and therefore value 0 is selected to be output by the selector 1002.

With the above explained configuration of the quantization processing control section 908, error data 1 is input into the input addition processing section 101 in the processing of the next pixel and added to the input pixel data. Error data 2 is stored in the data buffer unit 104 and input into the input addition processing section 101 in the processing of the next line to be added to the input image data. Thereby, for example, the error to be added to pixel 12 shown in FIG. 3A by the diffusion has a value obtained by the addition of [error of pixel 10]×coefficient A and [error of pixel 11]×coefficient B as error data 1, and [error of pixel 01]×coefficient C, [error of pixel 02]×coefficient D+[error of pixel 03]×coefficient E, and [error of pixel 04]×coefficient F as error data 2. Note that, for a pixel on which the error diffusion is not desired to be performed, setting zero to the coefficient of the corresponding pixel makes it possible not to perform the error diffusion. Further, the error retained within the error calculation section 103 in the processing of the last pixel in the processing for each of the colors in the input block is retained for use in the processing of the first pixel in the next input block. Note that, in the case of processing the first pixel of a line, the error retained in the error calculation section 103 is reset.

With reference to FIG. 7B, in the case of executing the dither processing, before the processing of the input image data of one page, the input addition value table is written into the memory 105. Then, in the case of executing the dither processing for the input image data, an input addition value of the pixel corresponding to the input block in the input addition value table is transferred from the memory 105 to the memory 1001 for each of the input blocks. Then, the input addition value corresponding to the processing object pixel of the input block related to the processing is output to the selector 1002 as the addition data. By adding this addition data to the input image data in the input addition processing section 101 (FIG. 2), a comparison result for each of the pixels between the addition result and one threshold value ("128" in the present embodiment) in the quantization processing section 102 becomes equivalent to that obtained by the dither processing using a predetermined dither pattern.

Figure 8:
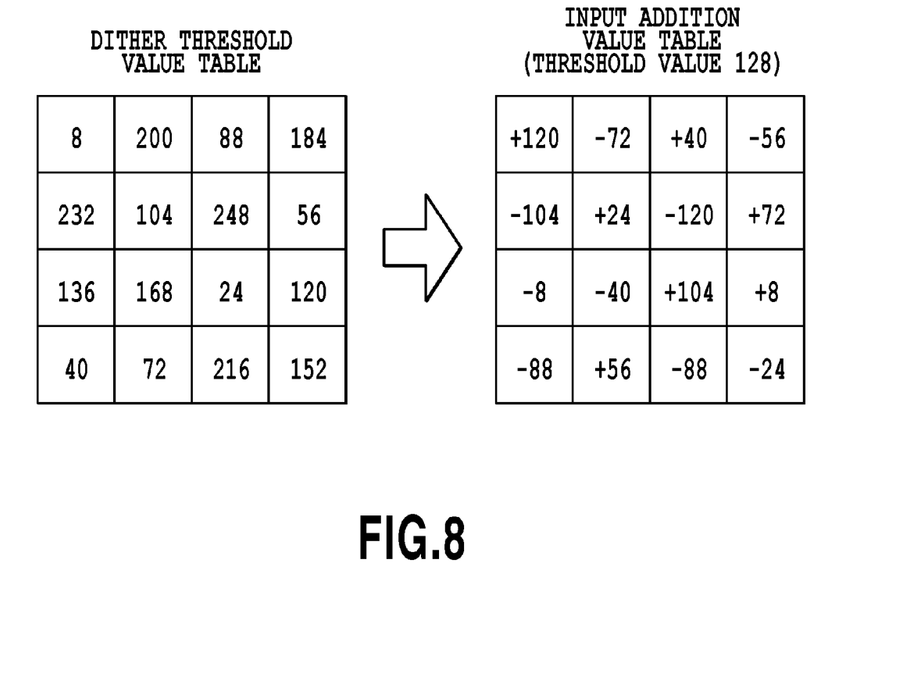
FIG. 8 is a diagram explaining an input addition value table according to a first embodiment of the present invention.

FIG. 8 is a diagram explaining the input addition value table according to an embodiment of the present invention. As shown in FIG. 8, the input addition value table defines an input addition value for each of the pixels for an image pattern with a predetermined size (in an example shown in the drawing, 4 pixels by 4 pixels, for simple illustration and explanation), and is applied to an input image of a size corresponding this pattern (4 pixels×4 pixels). The value (input addition value) for each of the pixels in the input addition value table is a difference value obtained by the subtraction of a threshold value of a predetermined dither table (dither pattern) assumed in the dither processing of the present embodiment from one threshold value (128) set for the quantization processing section 102. By adding this input addition value corresponding to each of the pixels to the input pixel data for each of the pixels, it is possible to obtain the same effect as that of a method in which the threshold value is varied according to the above predetermined dither pattern while keeping constant a threshold value in quantization in the quantization processing section 102. FIG. 8 shows an example of the case of quantizing the input image data of 256 gradation levels into binary data. The threshold value set in the quantization processing section 102 is 128, and the value of the input addition value table is generated by the subtraction of the threshold value of the above predetermined dither pattern from 128.

In the present embodiment, in the case of executing the dither processing, as described above, an error calculation section 103 generates a correction amount for the inter-color correction from the pre-quantization data and the error thereof from the quantized data obtained by the quantization processing section 102 and outputs the correction amount as error data 1. Then, error data 1 is added to the pixel value of the next color in the input image data by the input addition processing section 101. Note that, in the case that all the colors subjected to the inter-color correction have been processed for the pixel being processed, or in an inter-color case in which the inter-color correction is not performed, the error data retained in the error calculation section 103 is reset.

Figure 9:
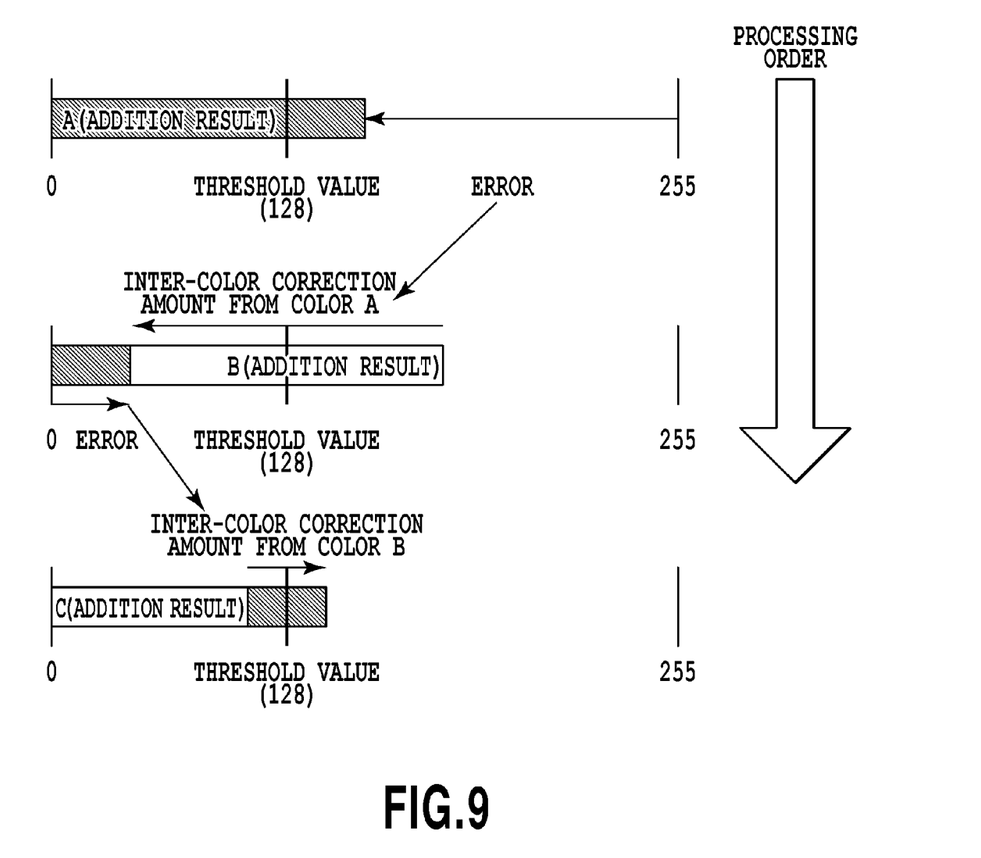
FIG. 9 is a diagram explaining inter-color correction processing in quantization into binary data according to the first embodiment.

FIG. 9 is a diagram explaining the inter-color correction processing in the case of the quantization into the binary data according to the present embodiment, and shows an example of performing the inter-color correction processing on the input image data of 256 gradation levels having three colors of A, B, and C. As explained above, the inter-color correction amount is calculated by multiplying the inter-color correction coefficient B by the error calculated in the error calculation section 103. As shown in FIG. 9, the quantization processing section 102 compares an addition result which is obtained in the input addition processing section 101 for color A by the addition of the pixel value of the input image data, error data 1 related to the processing of the previous color, and the input addition value, with the threshold value (128). Then, the error thereof (255—addition result) is added similarly as error data (inter-color correction amount) in the input addition processing section 101 to provide the addition result of color B. Then, this addition result is compared with the threshold value (128), and the error thereof becomes error data 1 (inter-color correction amount) for color C. The example shown in FIG. 9 is an example of assuming the inter-color correction coefficient B to be 1, and the errors in the quantization of color A and color B directly become the inter-color correction amounts for color B and color C. Note that, in this inter-color processing, the value of the input addition value table is added included in error data 1. Therefore, the data buffer unit 104 selects value 0 as the addition data in the selector 1002 in the second or subsequent color processing.

The inter-color correction processing makes it difficult to print a different color in a pixel where some color is already printed, and thereby it is possible to reduce the overlapping of inks as print color materials. Thereby, it is possible to reduce granular feeling of a print image. In the example shown in FIG. 9, while color A is printed in some pixel because exceeding the threshold value, color B becomes difficult to be printed because color A is already printed. Then, color C becomes easy to be printed because color B is not printed. In the case of the dither processing, the high speed memory 1001 within the data buffer unit 104 is divided into two areas as described above to be used as a double buffer (FIG. 6). For example, area 1 is assumed to be an area used for the input block being processed and area 2 is assumed to be an area used for the next input block. Thereby, the data buffer unit 104 can select and output the data corresponding to a processing position in the input addition value table from area 1. Further, the data buffer unit 104 can write the data to be used for the next input block in the input addition vale table into area 2 of the high speed memory within the data buffer unit 104 from the large capacity memory in the memory 105 during the processing of the input block. Then, in the processing of the next input block, the area 2 is used as an area used for the input block being processed, and area 1 is used as an area to be used for the next input block, and thereby it is possible to use the memory efficiently.

Second Embodiment

Figure 10:
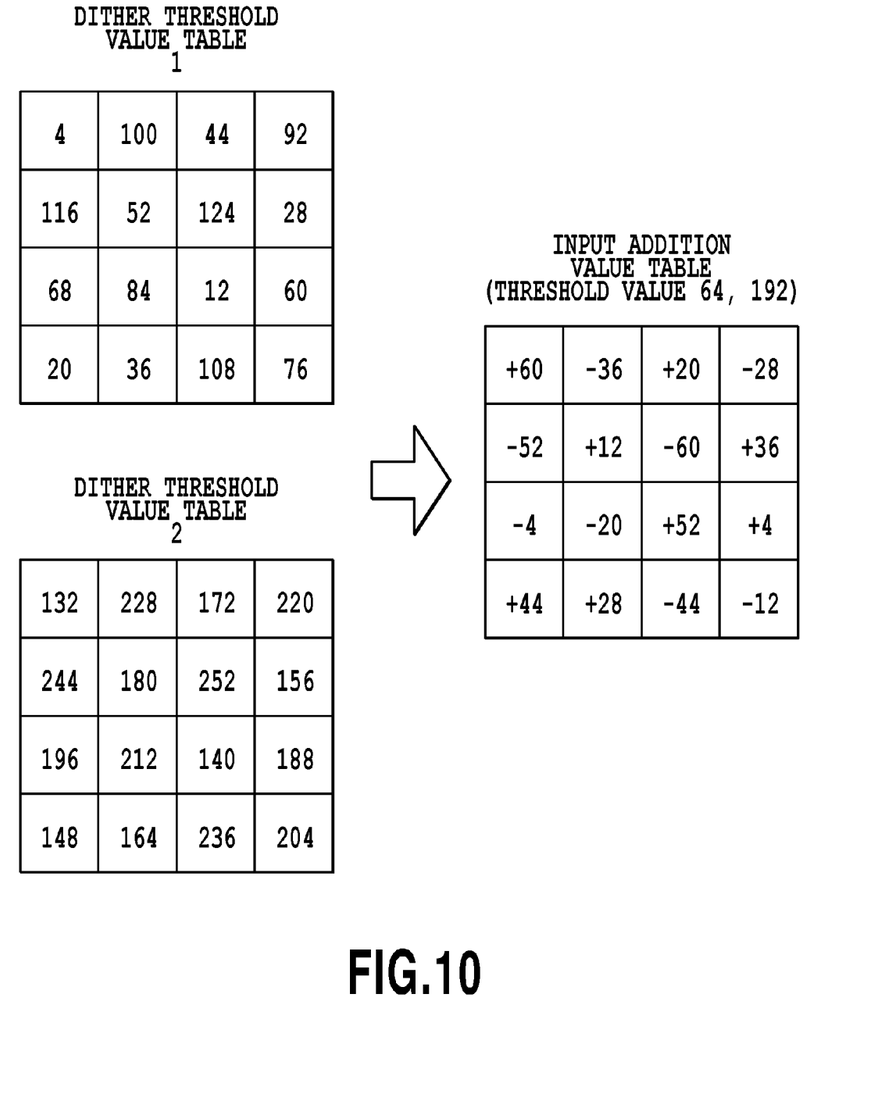
FIG. 10 is a diagram explaining an input addition value table according to a second embodiment of the present invention.

A second embodiment of the present invention relates to a mode of quantizing multi-value image data into multi-values of three or more values in the quantization by the dither processing. FIG. 10 is a diagram explaining an input addition value table according to the second embodiment of the present invention, and FIG. 11 is a diagram explaining inter-color correction processing in the case of quantization into three-value data according to the second embodiment.

As shown in FIG. 10, the threshold values set in the quantization processing section 102 are two values of 64 and 192 corresponding to the quantization into three-value data. Then, two tables of dither threshold value table 1 and dither threshold value table 2 are prepared as assumed dither patterns. Here, the threshold value for each of the pixels in the dither threshold value table 2 is a value obtained by the addition of 128 corresponding to a difference between the above two threshold values 64 and 192 and the threshold value of dither table 1. Thereby, it is possible to make the input addition value table common between the above two threshold values. The value (input addition value) for each of the pixels in the input addition value table set in this manner becomes a value obtained by the subtraction of the threshold values (64 and 192) set in the quantization processing section 102 from above threshold value of dither tables 1 and 2 assumed in the dither processing of the present embodiment, respectively.

Figure 11:
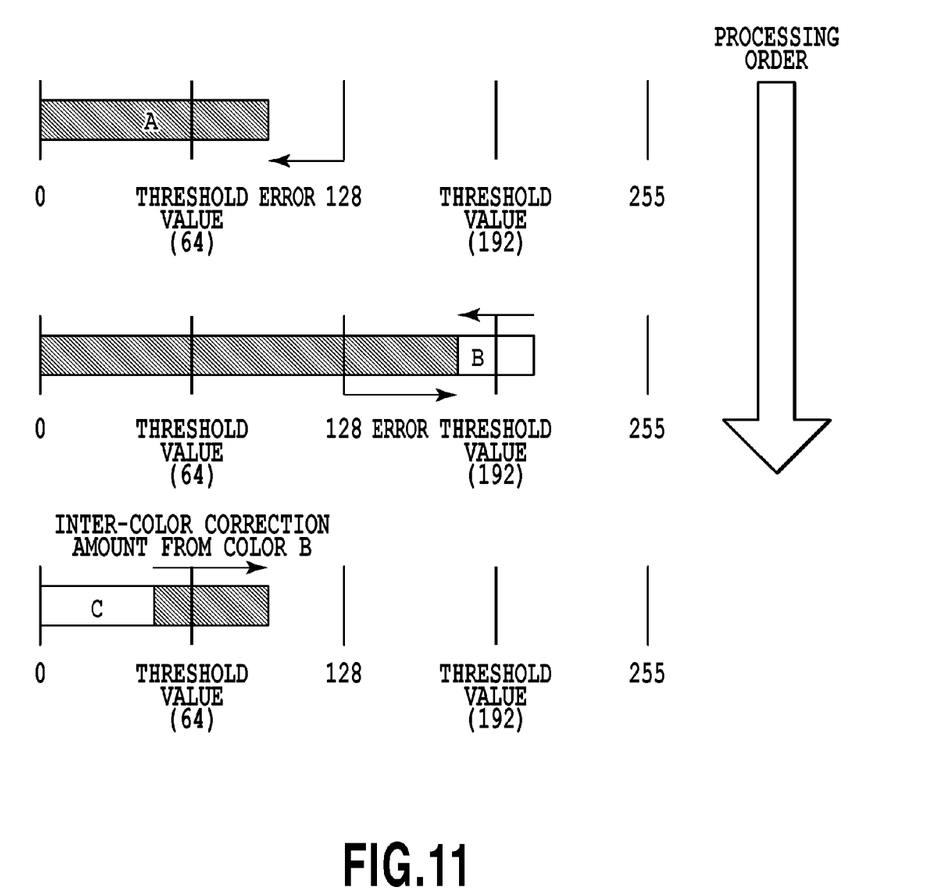
FIG. 11 is a diagram explaining inter-color correction processing in quantization into ternary data according to the second embodiment.

As shown in FIG. 11, also in the inter-color correction processing according to the present embodiment, the quantization processing section 102 compares an addition result for color A obtained by the addition of the pixel value of the input image data, error data 1 related to the previous color processing, and the input addition value in the input addition processing section 101, with each of the two threshold values (64 and 192). Then, the error thereof is calculated as a difference between 128 of a difference between the two threshold values (64 and 192) and the addition result. This error is similarly added as error data 1 (inter-color correction amount) in the input addition processing section 101 to provide the addition result of color B. Then, this addition result is compared similarly with the two threshold values (64 and 192), and the error thereof becomes error data 1 (inter-color correction amount) of color C.

Other Embodiments

While the above described embodiment switches between the error diffusion processing and the dither processing depending on the print mode, the present invention is not limited to this mode. For example, the circuit configuring the quantization processing control section explained in the above described embodiment may be used in common for various printing apparatuses such as a printer, and the quantization by the error diffusion processing or the dither processing may be executed depending on a printing apparatus for use.

Further, the processing of the above explained quantization processing control section is assumed to be executed in the printing apparatus. However, the present invention is not limited to this mode, and the above described quantization processing may be executed by a host apparatus using the circuit configuration of the quantization processing control section, for example. Then, it is also possible to execute the processing by preparing a nonvolatile storage medium storing programs causing a computer to execute the processing and installing the programs. In this manner, the present specification specifies an apparatus executing the above described quantization processing using the circuit configuration of the quantization processing control section to be an image processing apparatus including a printing apparatus such as a printer.

As explained above, according to the embodiments of the present invention, it is possible to perform the quantization by the error diffusion processing and the quantization by the dither processing using a common circuit including the processing except the common functions between these processing modes, and thereby it becomes possible to reduce the circuit scale of the quantization processing section by the common circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254032, filed Dec. 16, 2014, which is hereby incorporated by reference wherein in its entirety.

What is claimed is:

1. An image processing apparatus comprising:
a quantization unit configured to generate quantized data having smaller gradation levels than that of the pre-quantization data by using a comparison threshold value with which pre-quantization data of a processing object pixel is compared;
a generating unit configured to include an error input section for inputting error data between the quantized data generated by the quantization unit and the pre-quantization data and a memory storing a value corresponding to a difference between the comparison threshold value and an original threshold value allocated in a threshold matrix that defines threshold values according to an arrangement of pixels and to generate the value corresponding to the difference as an addition data that is added to a value of an input image data of the processing object pixel, without using the error data input to the error input section for adjusting the input image data of the processing object pixel; and
a processing unit configured to add the value of the addition data generated by the generating unit to the value of the input image data of the processing object pixel to output input image data to which the value of the addition data is added.

2. The image processing apparatus according to claim 1, wherein the memory which the generating unit includes stores a matrix that allocates the value corresponding to the difference for each of pixels in an image.

3. The image processing apparatus according to claim 1, further comprising an error calculation unit configured to calculate the error between the quantized data and the pre-quantization data based on the quantized data generated by the quantization unit and the pre-quantization data,
wherein the error calculation unit outputs the error data for the generating unit in which a calculated error is cancelled and the error data is input to the error input section of the generating unit.

4. The image processing apparatus according to claim 1, wherein the image data of the processing object pixel is reproduced with a plurality of color material of different colors on a print medium, the processing unit includes an error input section for inputting an error between the quantized data generated by the quantization unit and the pre-quantization data, performs processing for a first color of the color material for reproducing the image data of the processing object pixel and then performs processing for a second color of the color material for reproducing the image data of the processing object pixel, and adds an error generated by the processing unit performing the processing for the first color of the image data of the processing object pixel, the error being input to the error input section, to the second color of the image data of the processing object pixel.

5. The image processing apparatus according to claim 4, further comprising an error calculation unit configured to calculate the error between the quantized data and the pre-quantization data based on the quantized data generated by the quantization unit and the pre-quantization data,
wherein the error calculation unit outputs the calculated error data as a first error data for the processing unit and the processing unit uses the first error data input to the error input section of the processing unit to perform processing for the input image data.

6. The image processing apparatus according to claim 5, wherein the error calculation unit
outputs the first error data for the processing unit in which the error calculated for the first color is not cancelled in the case that the error for the first color generated in the processing for the first color performed by the quantization unit is used for the processing for the second color performed by the quantization unit, and
outputs the second error data for the processing unit in which the error calculated for the first color is cancelled in the case that the error for the first color generated in the processing for the first color performed by the quantization unit is not used for the processing for the second color performed by the quantization unit.

7. The image processing apparatus according to claim 5, wherein the error calculation unit outputs second error data in which error calculated by the error calculation unit is cancelled and the second error data is input to the error input section of the processing unit.

8. The image processing apparatus according to claim 3, wherein the image processing apparatus is capable of performing a first image processing mode in which error diffusion processing is performed and a second image processing mode in which dither processing is performed,
- in the first image processing mode, the error calculation unit outputs error data for the generating unit in which a calculated error is not cancelled, the error data is input to the error input section of the generating unit, the generating unit uses an error for a first color of a precedently processed first pixel, which is input to the error input section of the generating unit, in adjusting the value of data of the first color of a subsequently processed second pixel to the first pixel, and
- in the second image processing, the error calculation unit outputs error data for the generating unit in which a calculated error is cancelled.

9. The image processing apparatus according to claim 8, wherein the first image processing mode is a print image quality priority mode and the second processing mode is a print speed priority mode.

10. The image processing apparatus according to claim 8, wherein the generating unit uses a high-speed memory having a first access speed and a first capacity and a large capacity memory having a second access speed slower than the first speed and a second capacity greater than the first capacity, the high-speed memory being divided into three areas in a case of the first image processing mode and being divided into two areas in a case of the second image processing mode, and the generating unit gains an access between each of the areas of the and the high-speed memory and the large capacity memory.

11. The image processing apparatus according to claim 1, wherein the input image data is processed in a processing unit of an input block consisting of a predetermined number of pixels, and the quantization unit performs the processing for each color in the input block in a case of the first image processing mode and performs the processing for each pixel in the input block in a case of the second image processing mode.

12. The image processing apparatus according to claim 1, wherein the quantization unit generates the quantized data having three of more gradation levels smaller than that of the pre-quantization data, based on the pre-quantization data.

13. The image processing apparatus according to claim 1, further comprising a printing unit configured to perform printing by applying color materials to a print medium based on a quantized result by the quantization unit.

14. The image processing apparatus according to claim 13, wherein the printing unit includes an ink jet print head for ejecting ink.

15. The image processing apparatus according to claim 13, wherein the printing unit performs printing in an electrophotographic method.

* * * * *